(12) United States Patent
Bernard

(10) Patent No.: US 6,939,500 B2
(45) Date of Patent: Sep. 6, 2005

(54) METHOD AND APPARATUS FOR ELIMINATING A PARTING LINE WITNESS MARK FROM A MOLDED PART

(75) Inventor: Edward Helmut Bernard, Maidstone (CA)

(73) Assignee: Bernard Mould, Oldcastle (CA)

( * ) Notice: Subject to any disclaimer, the term of this patent is extended or adjusted under 35 U.S.C. 154(b) by 232 days.

(21) Appl. No.: 10/226,892

(22) Filed: Aug. 22, 2002

(65) Prior Publication Data
US 2003/0042649 A1 Mar. 6, 2003

Related U.S. Application Data
(60) Provisional application No. 60/316,091, filed on Aug. 30, 2001.

(51) Int. Cl.[7] ............................................... B29C 45/38
(52) U.S. Cl. .................. 264/328.9; 264/161; 264/163; 264/328.8; 264/328.11
(58) Field of Search ............................ 264/328.9, 161, 264/163, 328.11, 328.8

(56) References Cited

U.S. PATENT DOCUMENTS

| | | | | |
|---|---|---|---|---|
| 4,123,217 A | * | 10/1978 | Fischer et al. | .............. 425/525 |
| 5,069,832 A | * | 12/1991 | Okumura et al. | ........... 264/442 |
| 5,928,682 A | * | 7/1999 | Janca et al. | .................. 425/566 |
| 6,659,750 B1 | * | 12/2003 | Overmyer et al. | ............. 425/3 |
| 6,735,926 B1 | * | 5/2004 | Louviere | ..................... 53/467 |

* cited by examiner

Primary Examiner—Michael P. Colaianni
Assistant Examiner—Monica A. Fontaine
(74) Attorney, Agent, or Firm—Reising, Ethington, Barnes, Kisselle, P.C.; William J. Waugaman (57) ABSTRACT

Method and apparatus for molding a sealing surface of revolution on a molded part in first and second partable mold halves that mate at a major parting line plane. First and second mold inserts each have a sub-insert trim wheel component shaped to mold form the sealing surface of revolution when closed at a minor parting line plane. The sub-inserts are rotatable between a position flush with the major parting line plane and a starting position angularly offset therefrom. The mold cavity is filled with liquid molding material that is allowed to harden to at least a self-sustaining solidification strength. The sub-inserts are then rotated to thereby move any minor parting line flash toward a position angularly offset from their starting position. This rotation causes any parting line flash that might otherwise remain on the sealing surface to be removed from attachment to, and/or smeared smooth along, such surface.

10 Claims, 7 Drawing Sheets

METHOD AND APPARATUS FOR ELIMINATING A PARTING LINE WITNESS MARK FROM A MOLDED PART

This is a regular United States Utility patent application filed pursuant to 35 U.S.C. § 111 (a) and claiming the benefit under the provision of 35 U.S.C. §119 (e)(i) of the priority of U.S. Provisional Utility Patent Application Ser. No. 60/316,091 filed Aug. 30, 2001 pursuant to 35 U.S.C. §111 (b).

FIELD OF THE INVENTION

This invention relates to methods and apparatus for molding objects in a separable, two-part permanent mold wherein a parting line plane of the mold intersects the part being molded in the mold cavity, and more particularly to injection molding of plastic parts in a two-part separable mold of the foregoing character.

BACKGROUND OF THE INVENTION

In the manufacture of products and components of various complex shapes by molding or casting wherein a mold cavity is infilled with a molding or casting material in a liquid state and allowed to harden in the mold cavity, in most instances a separable mold is used that is made up of "core" and "cavity" half molds each having half cavities that when closed mate at a parting line in the mold to form the complete mold cavity. Even when so closed a minute separation remains in such mold cavity along the parting line between the two mold halves. This parting line gap is sometimes used as a venting space for the mold cavity, but in any event is unavoidable. Typically, the liquid molding material during molding will enter the gap at the parting line and then remain as a solidified rib-like protuberance on the finished molded or cast object after removal from the mold. Such parting line "witness marks" are often considered acceptable but unavoidable in the molding and casting art, although in some cases they are particularly or completely removed by various post-molding finishing operations such as machining, grinding, tumbling, etc. if the expense of such removal is deemed justified or necessary to meet the end use requirements for the cast or molded object.

In high pressure molding and casting in permanent molds, as is customary in plastic injection molding methods and machines, as well as in metal die casting methods and machines, the creation of parting line flash tends to be aggravated due to the pressurized injection of the liquefied molding or casting material. The mold mating faces must be machined to precision tolerances in order to ensure a tight fit of the two mold parts upon closure to thereby minimize the gap between the parts at the parting line plane. If the gap can be held down to say as little as three to five ten thousandths of an inch or less, creation of parting line flash can be eliminated or substantially reduced for most materials and at most injection pressures. However, this increases the cost of molds substantially. Reducing or eliminating parting line flash by tight fit of the mold parts at the parting line also greatly increases mold maintenance costs since tool wear and use tends to open up the parting line clearances or gap, thereby requiring that the mold parts be taken out of service and reworked in order to bring them back to original tolerance specifications.

One example of a surface area of a molded or cast part that cannot tolerate the existence of a parting line witness mark is where the part has an external or internal surface of revolution that is to become a fluid sealing surface by receiving thereon or therein one of various forms of elastomeric annular seal members, such as an O-ring. Since the sealing function of the O-ring requires that it be pressed or compressed tightly against the sealing surface of the part throughout the entire circumferential engagement between the seal and the part sealing surface, the existence of a transverse ridge on the sealing surface, such as that resulting from the presence of a parting line witness mark, cannot be tolerated. Such a transverse ridge lifts or raises the sealing surface of the O-ring radially away from the annular part sealing surface as the O-ring rides over the ridge, thereby either reducing or eliminating the ability of the O-ring or other seal member to effect a tight seal. In addition, the existence of such a parting line flash ridge often presents a sharp edge which will cut into the sealing material and also destroy its effectiveness as a seal.

In the prior art, closing down a parting line gap clearance or tolerance in the zone of the mold cavity that mold-forms the annular sealing surface has been a typical solution to this problem. However, with some materials and at some higher working pressures, material will still flash (i.e., escape from the mold cavity into the minute clearance between the mold parts at the parting line plane) even when the parting line gap is only somewhere between three and five ten thousandths of an inch. Typically, if the parting line clearance is sufficiently reduced in the part sealing zone area, in order to eliminate or substantially reduce the witness mark at the sealing surface, the adjacent or more remote areas along the parting line are allowed to have a greater clearance in order to provide sufficient venting of the mold cavity during the in-filling of the same. However, as the mold is cycled, it tends to wear and hence this original tight gap tolerance zone gradually opens up, and mold rework then becomes necessary. In many cases, the individual parts have to be subjected to the aforementioned post molding finishing operation, such as, in the case of plastic, trimming the flash mark or witness mark with a knife or a grinder. The economics of low volume runs often requires that this be a manual operation entailing significant labor costs as well as causing quality control problems in attempting to achieve a smooth finish sealing surface on the part within acceptable tolerance limits.

OBJECTS OF THE INVENTION

In view of the foregoing, one object of the present invention is to provide an improved method of molding a sealing surface on a molded part, and an improved apparatus for performing the method, wherein the sealing surface constitutes a surface of revolution and the part is molded in separable or partable first and second mold halves that mate and meet when closed at a major parting line plane that intersects the part being molded, and which overcomes one or more of the aforementioned problems of parting line flash leaving parting line witness marks on the finished molded product.

Another object is to provide an improved method and improved apparatus of the foregoing character that is applicable to permanent molds employed for plastic injection molding as well as metal die-casting, which can be applied to existing molds to convert the same with a relatively minor modification to the mold, which can be incorporated into the main mold to reduce or eliminate parting line witness marks during the molding process, or which can be used as a separate witness mark trimming or smearing machine operable to perform a post-molding finishing operation.

Still another object is to provide an improved method and improved apparatus of the foregoing character which is relatively simple in construction, reliable in operation, economical to construct and operate and which has a long service life.

SUMMARY OF THE INVENTION

In general, and by way of summary description and not by way of limitation, the present invention achieves one or more of the foregoing objects by providing an improved method and apparatus for molding a sealing surface on a molded part wherein the sealing surface constitutes a surface of revolution and the part is molded in separable first and second partable mold halves that mate and meet when closed at a major parting line plane. The mold halves each have a mold half cavity, the half cavities of the mold halves together defining a complete mold cavity having a molding surface complemental to the exterior contour of the part to be molded therein when the mold halves are closed together. First and second mold inserts halves are respectively provided in said first and second mold halves that each have a sub-insert trim wheel component each defining a cooperative mold half cavity. These trim wheel half cavities together define a complete annular molding surface shaped to encompass and define upon mold closure that portion of the complete mold cavity molding surface that is to mold form the sealing surface of revolution when the mold sub-inserts are closed together to define a minor parting line plane therebetween. These trim wheel sub-inserts are rotatably supported in the associated mold half inserts for rotation about an axis parallel to the major parting line plane such that the minor parting line plane of the mold sub-inserts is orientable by such rotation through a given range of angular travel, including a position flush with the mold major parting line plane.

After closing the mold halves together the sub-inserts are angularly rotatably positioned at an angular starting position such that the minor parting line plane is angularly offset a given amount from the flush planes position thereof. The complete mold cavity is then filled with molding material in a liquid state. The liquid molding material is then allowed to harden at least to a self-sustaining solidification strength at least in the part sealing surface zone adjacent the mold sub-inserts cavity-defining surfaces.

The sub-inserts are then rotated as a unit relative to the mold halves to thereby angularly shift the minor parting line plane of the sub-inserts to, and thereby move any parting line flash resident between the sub-inserts to, a second predetermined position angularly offset from the starting position whereby such sub-insert parting line flash that might otherwise remain on the sealing surface is removed from attachment to, and/or smeared smooth along, such surface. If desired, the sub-inserts may be further rotated with a rotary reciprocating back and forth motion to further smooth the sealing surface. The sub-inserts are then rotated to their flush planes position to thereby bring the minor and major parting lines flush with one another. Then the mold halves are opened to remove the completed molded part.

In one embodiment, the part sealing surface comprises an external groove adapted in use to receive an annular resilient seal member therein, such as an O-ring, that performs a sealing function by being forced against the part sealing surface. In this embodiment the sub-inserts mold cavity surfaces of revolution are made perfectly round (within normal precision mold tolerances).

In a further external groove embodiment, the internal diameter dimensions of the molding cavity surfaces of the mold sub-inserts defining during molding the part sealing surface of revolution have an out-of-roundness not exceeding the roundness tolerance of the annular seal. In this case the sub-inserts are positioned such that a first internal diameter zone of the complete annular molding surface of the sub-inserts is oriented adjacent the minor parting line, and a second internal diameter zone, having a smaller internal diameter than the first zone, is located angularly adjacent the first zone but angularly spaced therefrom within the angular range of travel of the sub-inserts when operated in the foregoing manner. This mold surface out-of-roundness upon said rotation, causes a squashing or smearing action on the parting line witness mark material that helps smooth the part sealing surface as the parting line witness mark is being removed.

BRIEF DESCRIPTION OF THE DRAWINGS

The foregoing, as well as other objects, features and advantages of the present invention will become apparent from the following detailed description, appended claims and accompanying drawings (which are to engineering scale unless otherwise indicated), wherein:

DETAILED DESCRIPTION OF PREFERRED EMBODIMENTS

Figure 1:
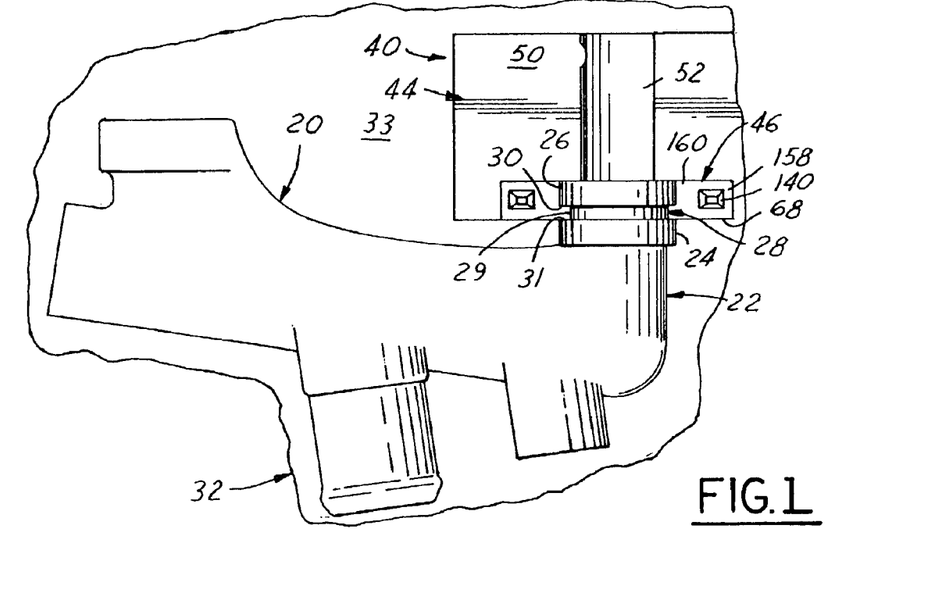
FIG. 1 is a fragmentary plan view of the lower or "cavity" mold half illustrating in simplified format a plastic injection-molded part as it would appear when the mold is opened with the part remaining in the lower mold half, the lower mold half being provided with a first embodiment of an insert containing a sub-insert in accordance with the present invention.

Referring in more detail to the accompanying drawings, FIG. 1 illustrates the improved method and apparatus of the invention in one preferred but exemplary first embodiment employed in the plastic injection molding of an automotive engine cooling system conduit 20. One elbow 22 of conduit 20 terminates in a pair of axially spaced apart cylindrical ribs 24 and 26 defining therebetween an external groove 28 dimensioned and configured as a sealing surface of revolution for receiving an annular O-ring seal therein (not shown) for providing a liquid-tight seal when the ribs 24, 26 are inserted into the bore of an associated engine block coolant port (not shown).

O-ring groove 28 thus has, in the illustrated exemplary embodiment, a cylindrical bottom wall 29 flanked by two radially extending sidewalls 30 and 31 to thereby form an external square-cut type sealing groove. In operative assembly, the O-ring (not shown) is designed to fit relatively snuggly in sealing groove 28 in its free-state condition, and then to be radially compressed by the associated encircling bore surface of the coolant engine block port when the collars 26 and 24 are telescoped therein. The compression of the O-ring that occurs during this assembly provides the sealing pressure of the O-ring against primarily the bottom wall 29 of groove 28, the O-ring also resiliently deforming and thereby also pressing against the groove radial sidewalls 30 and 31 to effect an appropriate sealed coupling against the liquid pressures extant in operation in the engine cooling system.

In FIG. 1 the lower mold half is indicated fragmentarily at 32 and has a top flat planar surface 33 that defines a major parting line plane intersecting coolant conduit 20 at its midsection, coincident with the longitudinal centerline axis of component 20. Mold half 32 is provided with a lower mold half cavity that is configured to define the appropriate half contour of part 20. An upper mold half (not shown) also has a mold half cavity likewise contoured and such that, upon closure together of the mold halves at their major parting line planes, they define a complete mold cavity having a molding surface complemental to the exterior contour of conduit 20.

Hitherto in the prior art, the major parting line plane likewise intersects the portion of conduit 20 defining the collars 24 and 26 in groove 28. Therefore a parting line "witness mark" ridge was hitherto formed in the parting line clearance gap between the upper and lower mold halves. Hence, when part 20 was removed from these prior art half mold parts upon parting or separation thereof, two rib-like protuberances extended radially along the sidewalls of groove 28 and axially across the bottom wall of the groove, one such rib at each diametrically opposite location aligned with the clearance gap at major parting line plane defined by lower half mold upper surface 33 and the corresponding surface of the upper mold half. Because these parting line "witness marks" would interfere with appropriate sealing operation of the O-ring in groove 28, hitherto these parting line ribs had to be removed by a post-molding manual knife cutting operation so that at least the bottom wall 29 of groove 28 was so trimmed and made smooth across the parting line plane intersection.

Figure 2:
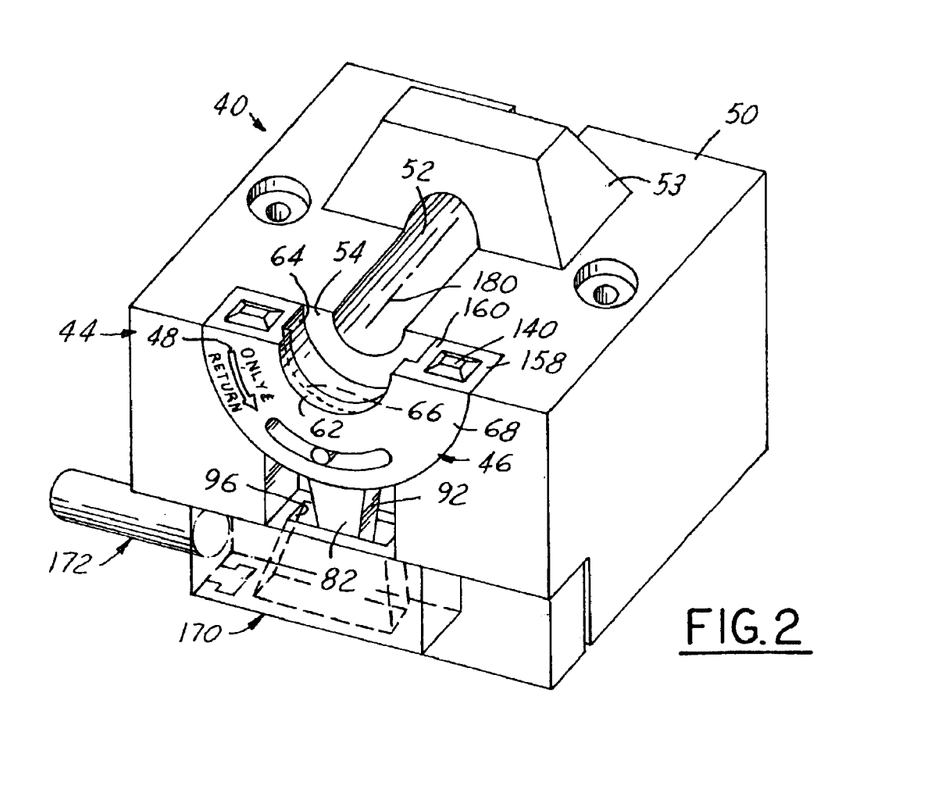
FIG. 2 is a simplified unscaled diagrammatic perspective view of the first embodiment of the lower mold half insert of FIG. 1, but shown by itself in FIG. 2 with this view being enlarged over that of FIG. 1.
Figure 3:
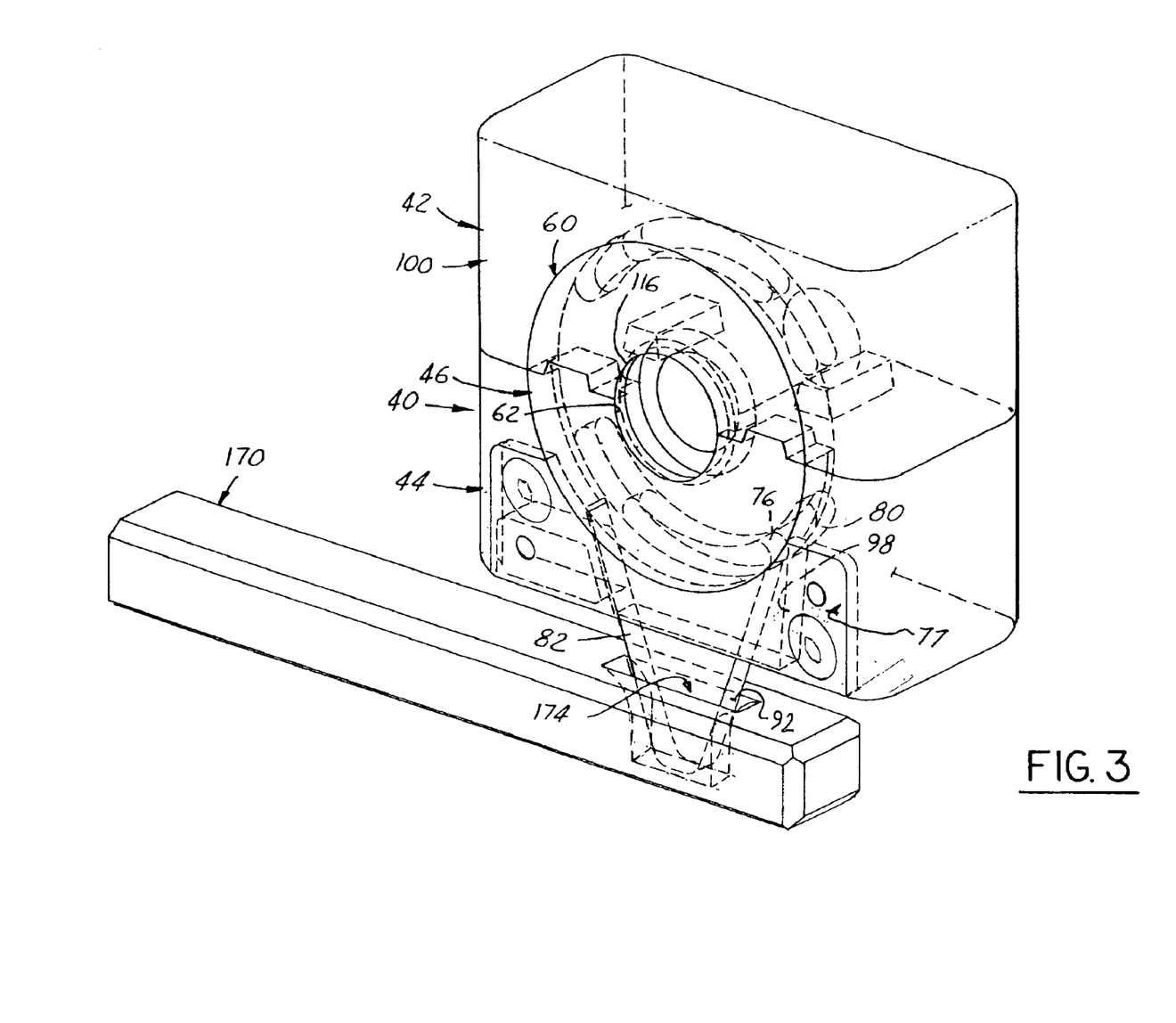
FIG. 3 is a perspective view of a second and presently preferred and slightly modified embodiment of upper and lower mold half inserts shown in mated closed condition by themselves apart from the associated mold halves and with an actuating trim driver bar shown operably coupled to the rocking arm of the core trim wheel sub-insert part of the lower half mold insert.
Figure 3A:
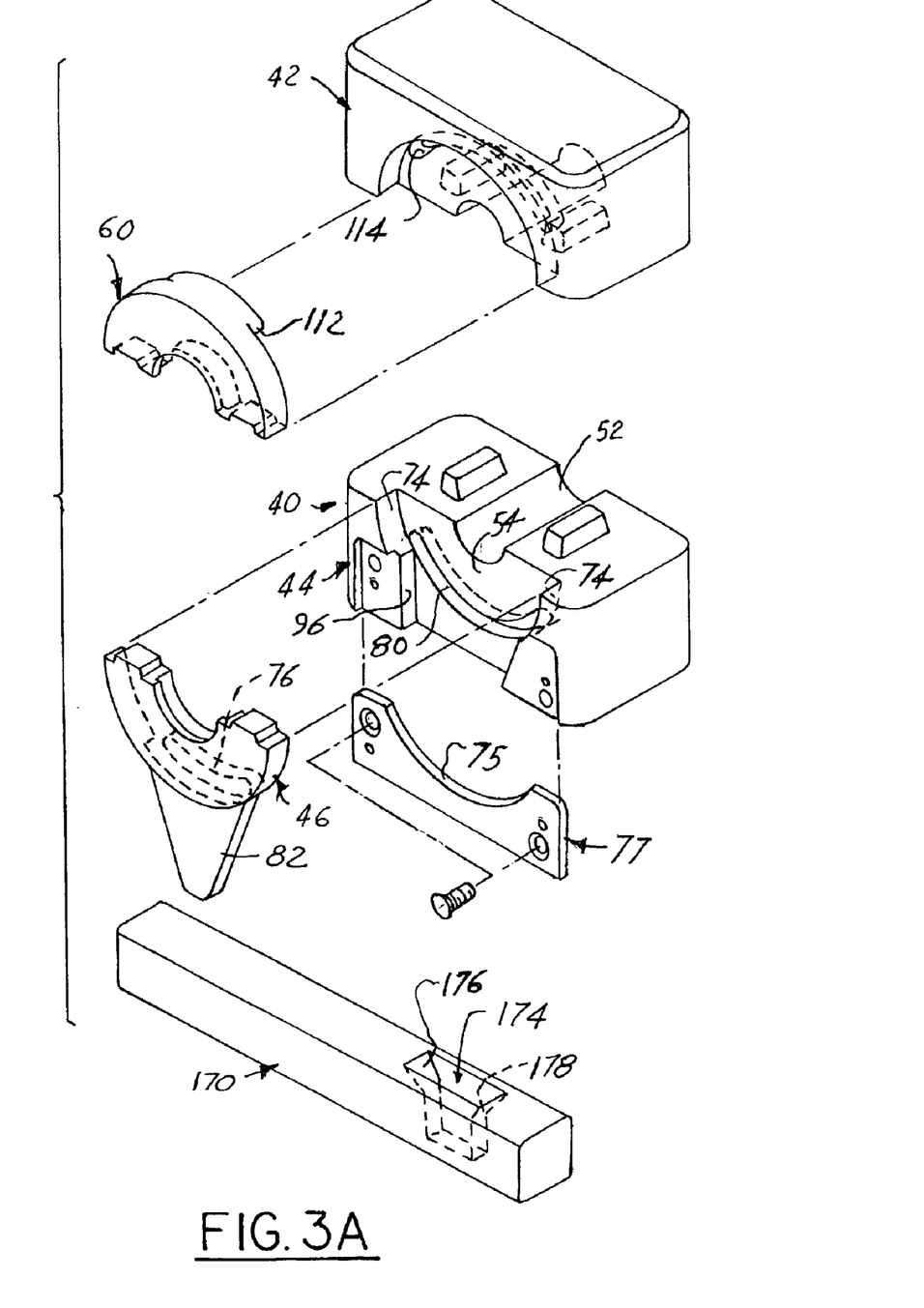
FIG. 3A is an exploded perspective view of the inserts and bar of FIG. 3.

In accordance with one of the principal features of the present invention, the lower or cavity mold half 32 and the associated upper or core mold half (not shown) are respectively provided with an associated lower mold half insert 40 (FIGS. 1, 2, 3 and 3A) and an upper mold half insert 42 (FIGS. 3 and 3A). Insert 40 is a sub-assembly made up of the insert body 44 and the trim wheel sub-insert 46 rotatably mounted therein for rocking motion as indicated by the arrow 48 in FIG. 2. Insert body 44 is shown by itself in FIGS. 10, 11 and 12, and the associated trim wheel sub-insert 46 is shown by itself in FIGS. 4, 5 and 6. Insert 40 is mounted in mold half 32 as shown in FIG. 1, so that it's top face 50 is flush with the top face 33 of mold half 32 to define therewith the major parting line plane of the lower mold half. A semi-cylindrical groove 52 in top face 50 aligns with the I.D. of elbow 22 and provides a slideway for a mold slide core (not shown) that forms an internal bore at elbow 22. In FIG. 2 an optional combined alignment key and core keeper 53 is also shown that bridges groove 52. The radially extending axial end face of elbow 22 is formed by a complimental mold cavity surface 54 of body 44 (FIG. 2). A cylindrical peripheral surface of rib 24 of elbow 22 is formed by a complimentary mold cavity surface formed in the half mold 32. These aforementioned mold cavity surfaces remain stationary during the molding of conduit 20 since insert 40 is mounted in fixed position in mold half 32.

Figure 7:
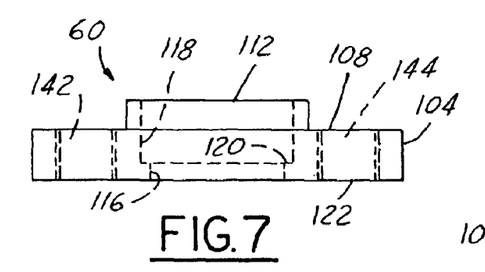
FIG. 7 is a top plan view of the cavity trim wheel sub-insert of the upper mold half insert of FIG. 3 and 3A.
Figure 8:
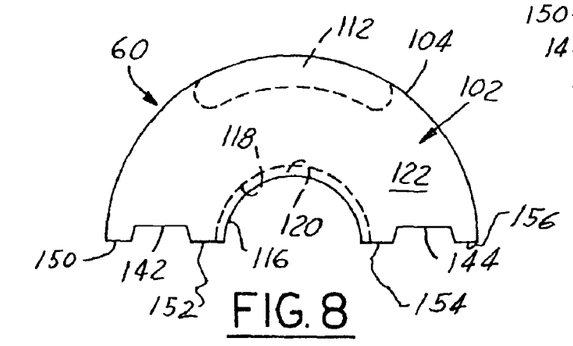
FIG. 8 is a front elevational view of the cavity trim wheel sub-insert of FIG. 7.
Figure 9:
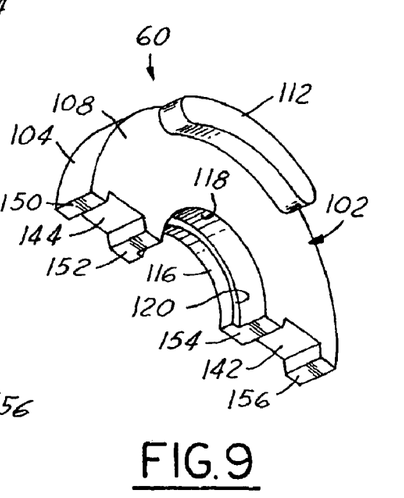
FIG. 9 is a perspective view of the cavity trim wheel sub-insert of FIGS. 7 and 8.

However, in accordance with the principal feature of the present invention, the mold cavity surfaces that define the annular or cylindrical bottom wall 29 and flanking sidewalls 30 and 31 of groove 28 are defined by a movable mold-cavity-defining part, namely trim wheel sub-insert 46 of the lower mold insert assembly 40 in association with the trim wheel sub-insert 60 (FIGS. 7, 8 and 9), that is similarly rotatably mounted for rocking motion in the upper mold half insert 42 (FIG. 3).

Figure 4:
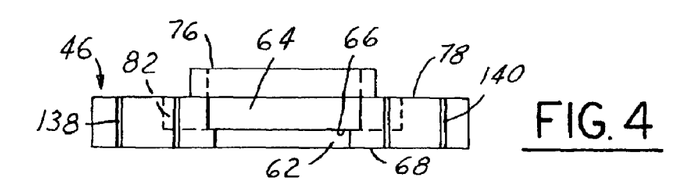
FIG. 4 is a top plan view of the core trim wheel sub-insert of the lower mold half insert of FIGS. 3 and 3A.
Figure 5:
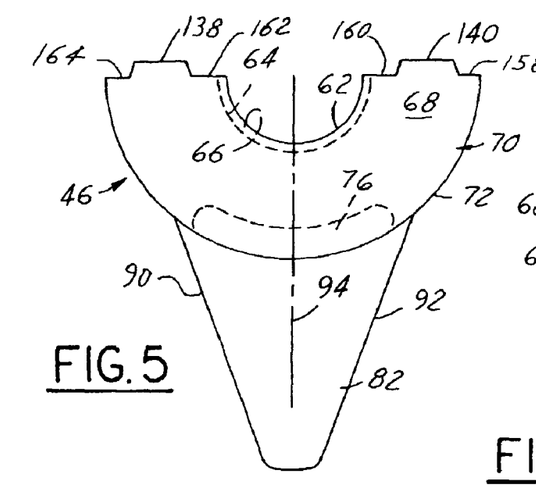
FIG. 5 is a front elevational view of the core trim wheel sub-insert of FIG. 4.
Figure 6:
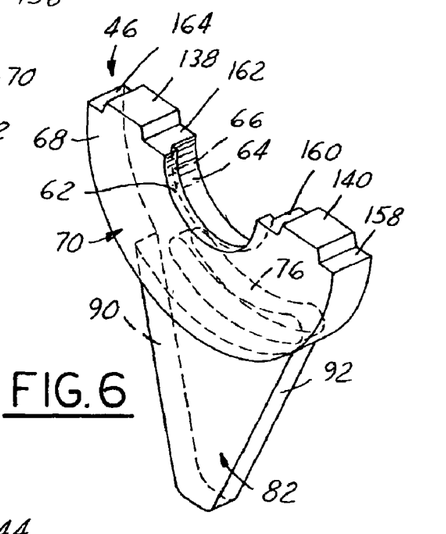
FIG. 6 is a perspective view of the core trim wheel sub-insert of FIGS. 4 and 5.

Thus, as best seen in FIGS. 4, 5 and 6, and by referencing FIG. 1 versus FIG. 2, sub-insert 46 has a semi-cylindrical cavity-defining surface 62 that mold-forms bottom wall 29 of groove 28. A larger diameter semi-cylindrical surface 64 forms the mold-cavity-defining surface that forms the cylindrical outer peripheral surface of conduit rib 26. The radially extending wall 66 that extends between surfaces 62 and 64 provides the mold-cavity-defining surface that mold-forms sidewall 30 of groove 28. A radially extending planar outer face 68 of sub-insert 46 provides the mold-cavity-defining surface that mold-forms the other radial sidewall 31 of groove 28.

Figure 10:
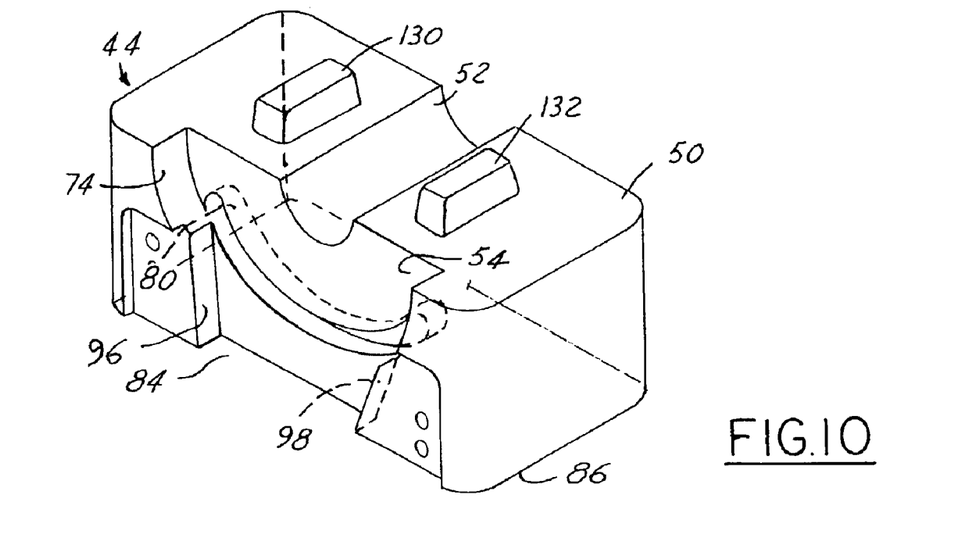
FIG. 10 is a perspective view of the core half mold insert body shown by itself.
Figure 11:
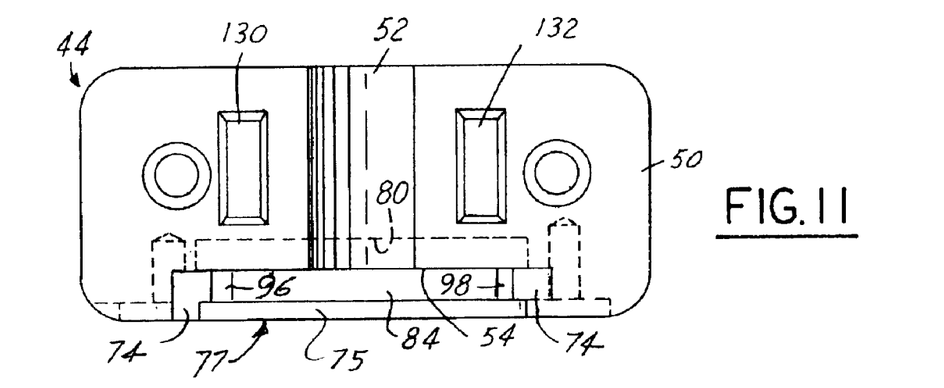
FIGS. 11 and 12 are respectively top plan and front elevational views of the core half mold insert body of FIG. 10.
Figure 12:
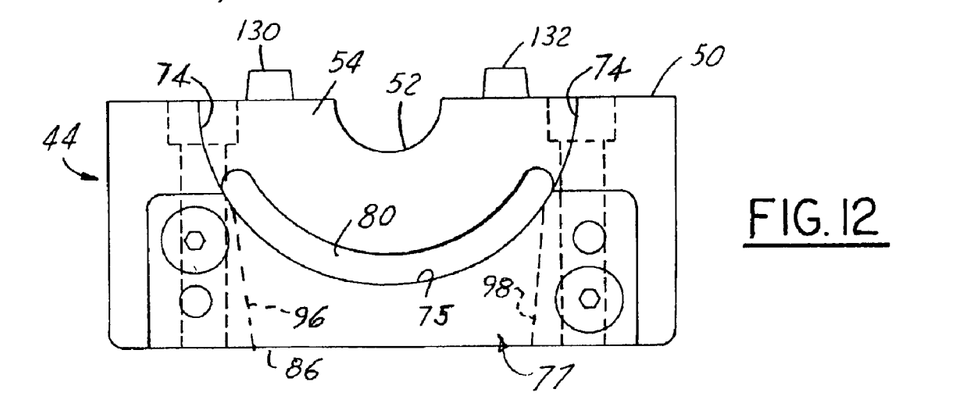

As also best seen in FIGS. 4, 5 and 6, lower mold sub-insert 46 has a crescent shape, semi-circular segment-like body 70 with an outer convex semi-cylindrical bearing surface 72 that rotatably seats on complimentary concave semi-cylindrical split bearing surfaces 74 of insert body 44 (FIGS. 10, 11 and 12), and on the like-configured intervening and aligned surface 75 of a removable retaining plate 77 (see FIG. 3A). An arcuate guide rib 76 of sub-insert 46 protrudes from its back face 78 and slidably seats with a close fit in a arcuate guide slot 80 undercut in face 54 of insert body 44 (FIGS. 3A, 10, 11 and 12). A wedge-shaped rocking arm 82 protrudes radially from the underside of sub-insert 46. In assembly of sub-insert 46 with insert body 44, arm 82 is received within and extends through a guide slot 84 formed between slots 77 and face 54 of insert body 44 so as to open at its upper end in bearing surfaces 74 and 75 and at its lower end in the bottom face 86 of body 44 (FIGS. 10, 11 and 12). As best seen in FIG. 5, the side surfaces 90, 92 of rocking arm 82 are convergent at an acute angle of about 40° and are symmetrical about the radial centerline 94 of sub-insert 46. These arm side surfaces 90, 92 are designed to alternately abut the cooperative convergent side surfaces 96 and 98 of body slot 84 which thereby serve as end limit stops defining the extreme end limits of angular travel of sub-insert 46 in body 44, as best seen in the operational views of FIGS. 16 and 17. In the illustrated embodiment, the angular range of travel of arm 82, and thus sub-insert 46, is about 16°, the extreme limits of such angular travel being illustrated respectively in FIGS. 16 and 17.

Figure 13:
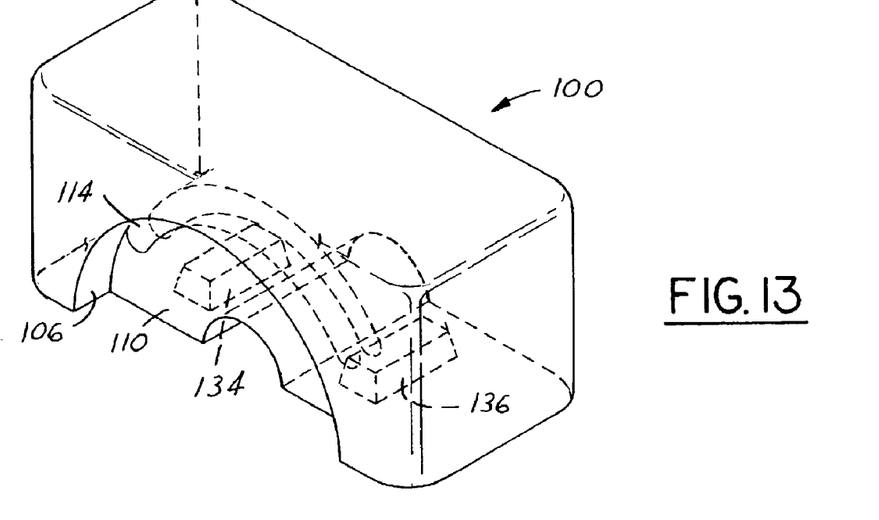
FIG. 13 is a perspective view of the cavity half mold insert body shown by itself.
Figure 14:
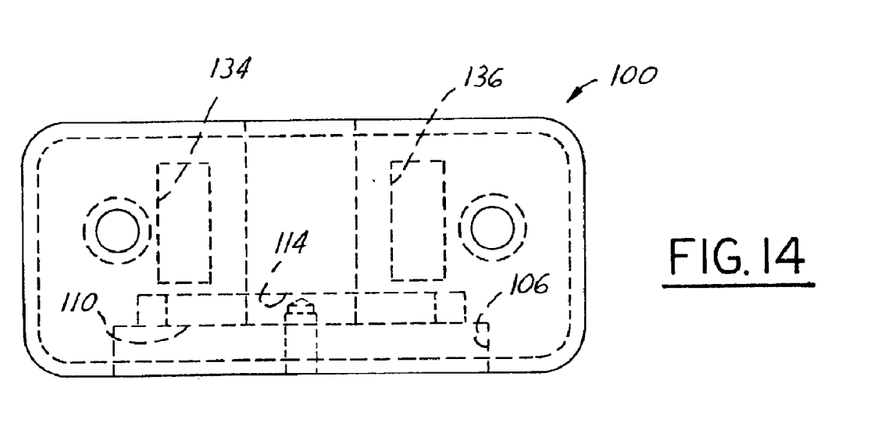
FIGS. 14 and 15 are respectively top plan and front elevational views of the cavity half mold insert body of FIG. 13.
Figure 15:
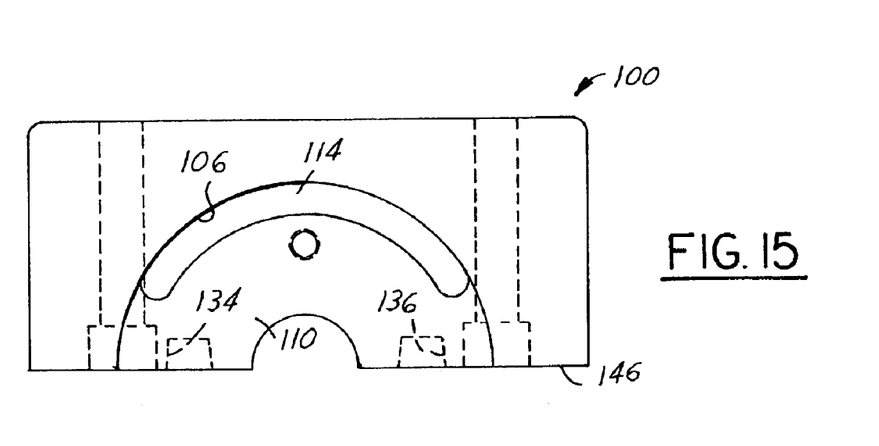
Figure 16:
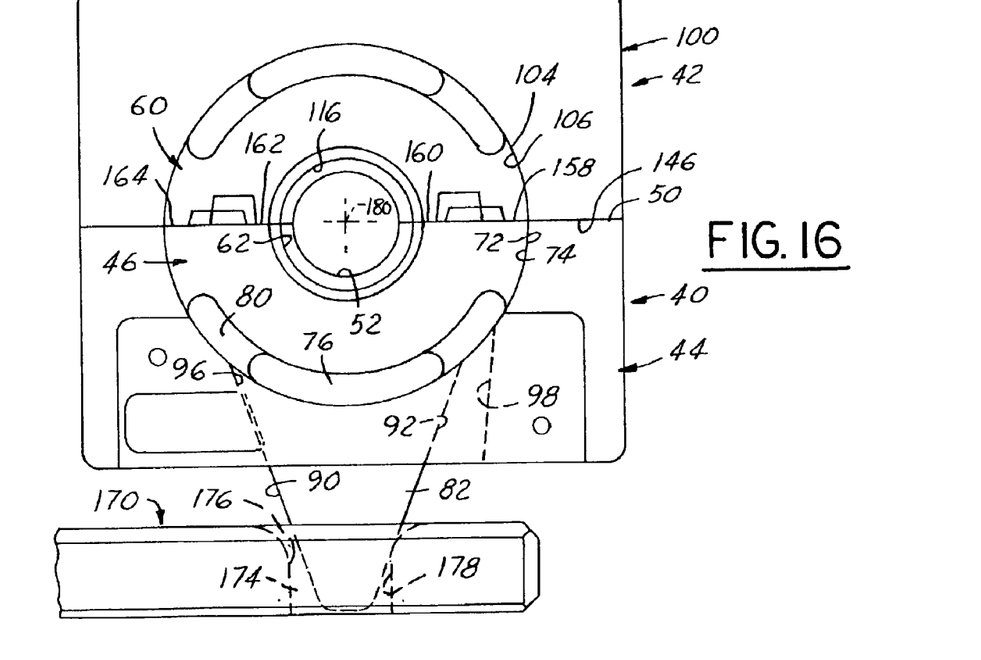
FIGS. 16 and 17 are front elevational views of the complete mold insert assembly of FIG. 3, FIG. 16 showing the parts in the flush planes position with the upper and lower trim wheel sub-insert components having their minor parting line plane line flush with the major parting line plane of the half mold insert bodies and thus with the major parting line plane of the associated core and cavity half mold parts (not shown), and FIG. 17 showing the trim wheel sub-insert assembly angularly repositioned to one extreme angular travel limit to thereby rotate the minor parting line plane of the trim wheel sub-inserts about 16° from the flush planes position, thereby illustrating a preferred but exemplary mode of operation of such components.
Figure 17:
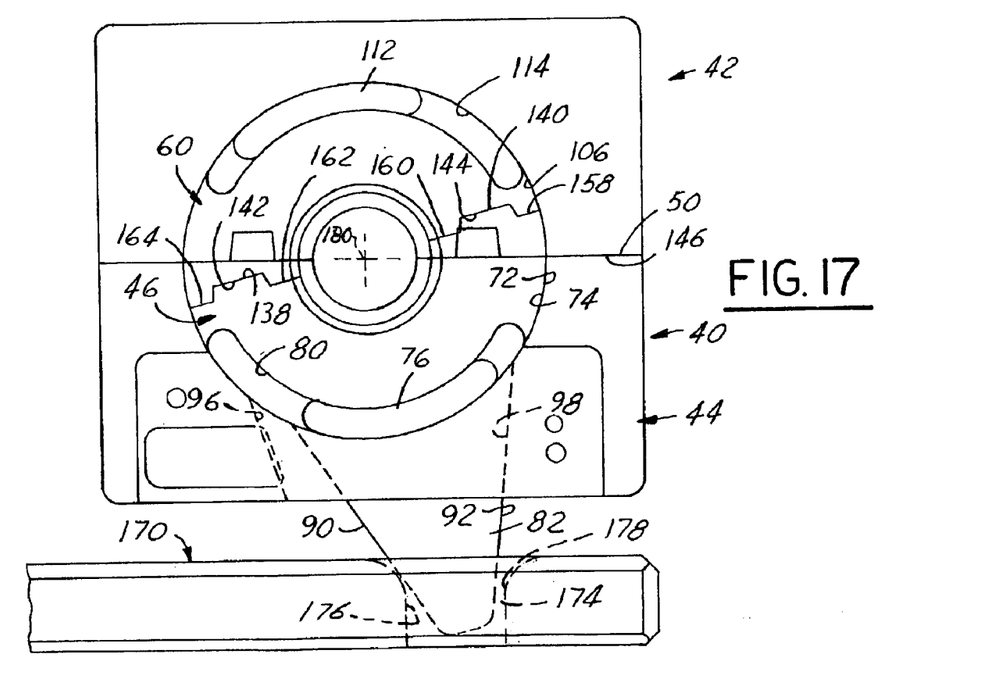

The remaining 180° of circumferential extent of the O-ring groove 28 in conduit 20 is formed by the corresponding complimentary surfaces in the upper mold half (not shown) corresponding to lower mold half 32, and by the associated upper mold half insert assembly 42 made up of upper insert body 100 (shown by itself in FIGS. 13, 14 and 15, and in mold-closed assembly with lower mold insert assembly 40 in FIGS. 3, 16 and 17), and the trim wheel sub-insert 60 (shown by itself in FIGS. 7, 8 and 9), and in assembly with upper insert body 100 in FIGS. 3, 16 and 17. Upper wheel trim sub-insert 60 is essentially a mirror-image part of lower sub-insert 46, minus the rocker arm 82. The same is generally true of upper insert body 100 relative to lower insert body 44, minus the rocker arm slot 84.

Thus sub-insert 60 has a semi-circular segment-like body 102 with a semi-cylindrical outer peripheral surface 104, (FIGS. 7, 8 and 9) that slidably bears on a complimentary semi-circular bearing surface 106 of insert body 100 (FIGS. 13, 14, 15, 16 and 17). Likewise, the back face 108 of sub-insert 60 bears against the back face 110 of the sub-insert socket of body 100. An arcuate guide lug 112 is slidably received with a precision fit in the guide slot 114 provided in the back face 110 of insert body 100.

The groove-forming, mold-cavity-defining surfaces of sub-insert 60 constitute the semi-cylindrical surface 116 (corresponding to surface 62 of sub-insert 46) that completes the mold cavity surface for mold-forming the groove bottom wall 29. The larger diameter semi-cylindrical surface 118 of sub-insert 60 (corresponding to surface 54 of sub-insert 46) forms the other half of the outer periphery of rib 26. The radially extending surface 120 extending between surfaces 116 and 118 mold-forms the other half of groove sidewall 30. The front face 122 of sub-insert 60, together with front face 68 of sub-insert 46, mold-form the other sidewall 31 of groove 28.

Upon mold closure, a pair of locating wedge lugs 130 and 132 of lower insert body 44 (FIGS. 10, 11 and 12) nest into cooperative nest guide pockets 134 and 136 respectively of upper insert body 100 (FIGS. 13, 14 and 15) to thereby accurately align the insert bodies 44 and 100 with one another. Likewise, the sub-insert trim wheel body 70 has a pair of wedge guide lugs 138 and 140 that, upon mold closure, guidably nest in guide wedge pockets 142 and 144 of wheel trim sub-insert 60.

Upper insert body 100, like lower insert body 40, is suitably fixedly mounted in the upper mold half so that the lower face 146 of body 100 lies flush with the major parting line plane face (not shown) of the upper mold half (not shown). Likewise, in the mold-opening and mold-closing position of the trim wheel sub-inserts 46 and 60 shown in FIG. 16, the coplanar lower faces 150, 152, 154 and 156 of upper sub-insert 60 (FIGS. 8 and 9), and the mating upper faces 158, 160, 162 and 164 of lower sub-insert 46 (FIGS. 5 and 6) are mutually abutted with a parting line gap clearance therebetween. These trim wheel mating faces thereby define a minor parting line plane which, in the "flush planes" position of FIGS. 3 and 16, is flush with the major parting line plane of insert faces 50 and 146 as well as the surrounding parting line faces 33 of the lower mold half 32 and the corresponding parting line face of the upper mold half (not shown).

This minor parting line plane of the sub-inserts is angularly shiftable from the flush planes position of FIG. 16 to the angularly offset position of FIG. 17 by longitudinally shifting a driver bar 170 (FIGS. 2, 3, 16 and 17) that is slidably mounted in a suitable manner for reciprocation in the structure of the lower mold half 32. Driver 170 may be actuated by a suitable source of motive power, such as the hydraulic piston 172 schematically illustrated in FIG. 2, or alternatively by a servo-drive type electric motor of conventional construction, under the control of a suitable hydraulic and/or electrical control circuit associated with the molding machine cycle control system in which the mold halves are mounted, as will be readily understood by those of ordinary skill in the art. Driver 170 has a suitable through-slot 174 with opposite sidewalls 176 and 178 of convex-entry curvature and defining the clearance space slot 174 therebetween (FIGS. 3, 3A, 16 and 17) into which the tapering free end of arm 82 protrudes with sufficient clearance for accommodating the rocking motion between the positions of FIGS. 16 and 17.

In the operation of the improved molding apparatus of the invention in performing the improved method of molding of the invention, it will be seen that the upper and lower mold halves are respectively provided with the upper and lower mold insert assemblies 40 and 42 that each have mounted therein the associated upper and lower sub-insert trim wheel components 60 and 46. Each of these trim wheel components define a cooperative mold half cavity that defines a complete annular molding surface 62, 116; 66, 120; 64, 118; and 68, 122 configured to mold-form the O-ring groove 28 in elbow 22. Sub-inserts 46 and 60 are rotatably supported in their respective mold inserts 44 and 100 for rotation about an axis 180, (FIGS. 2, 16 and 17) oriented coincident with the major parting line plane (33–50–146) of the mold halves, so that the minor parting line plane (150–164) of the mold sub-inserts is orientable by such rotation through a given range of angular travel, e.g., 16° as illustrated in FIGS. 16 and 17. This travel range includes a position wherein the minor parting line plane is flush with the mold major parting line plane, i.e., FIG. 16.

In the operational sequence, the mold halves are closed together with the sub-inserts positioned as shown in FIG. 16. Preferably the sub-inserts then are angularly rotated to an angular starting position so that the minor parting line plane is angularly offset a given amount from the flush planes position thereof shown in FIG. 16. For example, this may be the full end limit position of FIG. 17 with a 16° angular repositioning or offset from FIG. 16. Alternatively, the starting position may be at mid-stroke in this range, i.e., at approximately 7 or 8° rotation from the position of FIG. 16.

Then the complete mold cavity is infilled with molding material in liquid state in a conventional manner. The liquid molding material is then allowed to harden at least to a self-sustaining solidification strength, at least in the sealing surface zone of conduit part 20 adjacent the aforementioned mold-sub-inserts cavity-defining surfaces that form the O-ring groove 28.

At this point in the molding cycle the sub-inserts are rotated by actuation of driver 170 so that it forces rocker arm 82 clockwise as viewed in FIG. 17 toward the FIG. 16 position, such timed motion being under the control of aforementioned control circuit and system. This rotation angularly shifts the minor parting line plane of the sub-inserts to a second predetermined position angularly offset from the starting position. This rotation also moves any parting line flash that has become resident between the sub-inserts to this second position as it is carried with the rotating sub-inserts. Hence, the sub-insert parting line flash that might otherwise remain on the O-ring sealing surface bottom wall 29, as well as secondarily on the sidewalls 30 and 31, is removed from attachment to these walls and/or smeared along the wall surfaces being molded, in either event thereby removing the parting line witness mark from the O-ring groove surfaces being molded.

The sub-inserts are then rotated to their flush planes position of FIG. 16 to thereby bring the minor and major parting lines flush with one another. At this point the mold is opened to remove the completed molded part 20. The improved result is then evident from inspection of the finished part, i.e., the O-ring groove surfaces forming O-ring groove 28 are characterized by the removal of any parting line witness mark, at least from the bottom wall 29 of the groove, where the presence of a parting line witness mark constitutes a serious problem from the standpoint of interfering with appropriate sealing action of an O-ring seated in the groove.

It is to be understood that the action of rotating the sub-inserts after the molding material has reached the self-sustaining solidification strength in the vicinity of the O-ring groove area 28 may include a further rotary reciprocation motion to thereby rock the sub-inserts back and forth to thereby effect a further smoothing action on the sealing surfaces of the O-ring groove being mold-formed. Although the preferred example of the molding method and machine of the invention disclosed therein is illustrated in conjunction with the making of an external O-ring groove 28, it is also to be understood that the principles of the invention are also applicable to forming internal sealing grooves, and to annular cylindrical sealing surfaces that are not grooved, both internal and external. They are also applicable to planar sealing surfaces on the part being molded wherein the sub-inserts are bodily shiftable together in a plane with a linear reciprocating motion instead of a rotary motion as disclosed in the preferred example herein.

As another embodiment of the invention (not shown), the circularity dimensions of the aformentioned groove-forming surfaces of revolution of the sub-inserts, instead of being machined to be perfectly round within precision mold making tolerances, are modified such that geometric shape of surfaces 62 and 116 have a slight out-of-roundness, e.g., a slight ovality, but not exceeding the roundness tolerance of the annular seal, i.e., O-ring, to be employed in the groove 28. In this case, the sub-inserts are positioned so that a first internal diameter zone of the complete annular molding surfaces 62, 116 is oriented adjacent to the minor parting line of the sub-inserts. A second internal diameter zone, of smaller diameter than the first zone, is located angularly adjacent the first zone and is angularly spaced therefrom within the angular range of travel of the sub-inserts. Hence, when the rocking motion is imparted to the sub-inserts, (i.e., upon the molding material reaching the aforementioned self-sustaining solidification strength), the smaller diameter second zone will squash the flash being carried in the minor parting line gap and thereby help smooth the same against the bottom wall 29 of the O-ring groove 28 being formed.

From the foregoing description and accompanying drawings it will now be readily understood by those of ordinary skill in the art that the improved method and improved apparatus of the invention provides an efficient and economical procedure and structure to eliminate the typical parting line witness mark within an O-ring groove on an injection-molded plastic part, or on a die-cast structure molded metal part, by creating a motion that will relocate the parting line position during the mold cycle.

It will be understood that the different plastic materials that are conventionally molded are molded at different temperatures and for varying durations of injection periods and curing periods. Thus, different repositioning or rotating sequences will be required to suit the particular conditions and materials of the molding cycle. For example, these rotational sequences can include, but are not limited to:

(1) a single partial rotation immediately after plastic material injection, or at some later but still advantageous point during the mold cycle prior to part ejection or removal.

(2) a full rotation, or alternatively, numerous rotations during the mold cycle.

(3) either a single partial rotation or numerous partial rotations, or a single full rotation or numerous rotations after injection but during the mold cycle prior to removal from the mold.

The aforementioned alternative of using a not-quite round (but within the O-ring round tolerance) shape may be used to rotate in such a way that the smaller diameter round zone of the round shape will constrict the parting line flash that was created at the larger round shape and thereby compress or smear the original parting line witness mark material along the groove wall.

It will be further understood that the rotation of the sub-inserts 46, 60 required for the process of the invention can be accomplished by any usual methods including a hydraulic powered motion, a cam-driven motion, a rack and pinion powered motion, an electric motor servo drive motion, or any other conventional controllable methods and apparatus for driving the motion of the sub-inserts.

It will also be understood by those of ordinary skill in the art that the materials used for making the sub-inserts 46 and 60 and the surrounding insert bodies 44 and 100 will conform to the necessary metallurgical requirements to ensure proper function within molding conditions, including considerations for wear, thermal transfer, lubricity, maintenance and service, and ease of service or replacement. Insert coatings will also be used as needed, depending on molding requirements. Moreover, vents and vent designs will be included per normal molding practices, except in the case of excess material that might be broken off of the parting line rather than being otherwise eliminated in the rotation process. In this event, in may become necessary to provide a channel for this broken-off excess material to be evacuated from the mold using a suitable conventional mechanism, gravity chute, air flow, or a combination of such slug removal methods.

It will also be understood that the sub-assembly mechanism of the insert assemblies 40 and 42 may be usable in a post-molding method and apparatus set-up in which the prior art part carrying the parting line witness mark material is placed in the lower sub-assembly 40, the upper sub-assembly 42 closed on the part, and then suitable heat is applied by heaters or by friction. The rocking motion of the sub-inserts is then used to eliminate the parting line witness mark, assuming the part has been molded of a thermoplastic material that is heat softenable. It will be thus apparent that the improved methods and apparatus as disclosed hereinabove amply fulfill one or more of the aforestated objects and provide many novel features and advantages over the prior art.

What is claimed is:

1. A method of molding a sealing surface on a molded part and the part is molded in separable first and second pat-table mold halves that mate and meet when closed at a major parting line plane, the mold halves each having a mold half cavity, the half cavities of the mold halves together defining a complete mold cavity having a molding surface complemental to the exterior contour of the part to be molded therein when the mold halves are closed together, said method comprising the steps of:

(a) providing respectively in said first and second mold halves first and second mold inserts that each have a sub-insert flash trimming component each defining a cooperative mold half cavity, said trim half cavities together defining a complete molding surface shaped to encompass and define upon mold closure that portion of the complete mold cavity molding surface that is to mold form said sealing surface when said mold inserts are closed together to define a minor parting line plane therebetween, (b) movably supporting said sub-inserts in said associated inserts mold half for motion such that the minor parting line plane of said mold sub-inserts is orientable by such motion through a given range of travel including a position flush with the mold major parting line plane, (c) closing the mold halves together.

(d) positioning said sub-inserts at a starting position such that the minor parting line plane is positioned at a given orientation relative to the flush planes position thereof, (e) then filling the complete mold cavity with molding material in a liquid state, (f) allowing the liquid molding material to harden at least to a self-sustaining solidification strength at least in the part sealing surface zone adjacent the mold-sub-inserts cavity-defining surfaces, (g) then moving the sub-inserts as a unit relative to the mold halves to thereby shift the minor parting line plane of the sub-inserts to thereby move, and thereby trim, any parting line flash resident between the sub-inserts to, a second predetermined position offset from the starting position whereby such sub-insert parting line flash that might otherwise remain resident on the sealing surface is substantially removed from its residence position on such surface at the starting position of said sub-inserts, (h) then moving the sub-inserts to their flush planes position to thereby bring the minor and major parting lines flush with one another, (i) then opening the mold halves to remove the completed molded part.

2. The method of claim 1 wherein step (g) includes further moving the sub-inserts with a reciprocating back and forth motion to smear smooth the parting line flash along the sealing surface.

3. The method of claim 1 wherein the part sealing surface comprises an external groove adapted in use to receive a resilient seal member therein that performs a sealing function by being forced against the sealing surface.

4. The method of claim 3 wherein the internal dimensions of the molding cavity surfaces of the mold sub-inserts defining during molding the part sealing surface have an out-of-parallelism clearance dimension not exceeding the working tolerance of the seal, and wherein step (d) comprises positioning the sub-inserts such that a first clearance dimension zone of the complete molding surface of the sub-inserts is oriented adjacent the minor parting line and a second clearance dimension zone is located adjacent said first zone and is spaced therefrom within the range of travel of the sub-inserts when operated in steps (d), (g) and (h), said second zone having a smaller clearance dimension than said first zone.

5. A method of molding a sealing surface on a molded part wherein the sealing surface constitutes a surface of revolution and the part is molded in separable first and second partable mold halves that mate and meet when closed at a major parting line plane, the mold halves each having a mold half cavity, the half cavities of the mold halves together defining a complete mold cavity having a molding surface complemental to the exterior contour of the part to be molded therein when the mold halves are closed together, said method comprising the steps of:

(a) providing respectively in said first and second mold halves first and second mold inserts that each have a sub-insert flash trimming wheel component each defining a cooperative mold half cavity, said trim wheel half cavities together defining a complete annular molding surface shaped to encompass and define upon mold closure that portion of the complete mold cavity molding surface that is to mold form said sealing surface of revolution when said mold inserts are closed together to define a minor parting line plane therebetween, (b) rotatably supporting said sub-inserts in said associated inserts mold half for rotation about an axis parallel to the major parting line plane such that the minor parting line plane of said mold sub-inserts is orientable by such rotation through a given range of angular travel including a position flush with the mold major parting line plane, (c) closing the mold halves together, (d) angularly rotatably positioning said sub-inserts at an angular starting position such that the minor parting line plane is angularly positioned at a given angular orientation relative to the flush planes position thereof, (e) then filling the complete mold cavity with molding material in a liquid state, (f) allowing the liquid molding material to harden at least to a self-sustaining solidification strength at least in the part sealing surface zone adjacent the mold-sub-inserts cavity-defining surfaces, (g) then rotating the sub-inserts as a unit relative to the mold halves to thereby angularly shift the minor parting line plane of the sub-inserts to, and thereby move, and thereby trim, any parting line flash resident between the sub-inserts to, a second predetermined position angularly offset from the starting position whereby such sub-insert parting line flash that might otherwise remain resident on the sealing surface is substantially removed from its residence position on such surface at the starting position of said sub-inserts, (h) then rotating the sub-inserts to their flush planes position to thereby bring the minor and major parting lines flush with one another, (i) then opening the mold halves to remove the completed molded part.

6. The method of claim 5 wherein step (g) includes further rotating the sub-inserts with a rotary reciprocating back and forth motion to smear smooth the parting line Flash along the sealing surface.

7. The method of claim 5 wherein the part sealing surface comprises an external groove adapted in use to receive an annular resilient seal member therein that performs a sealing function by being forced against the sealing surface.

8. The method of claim 7 wherein the internal diameter dimensions of the molding cavity surfaces of the mold sub-inserts defining during molding the part sealing surface of revolution have an out-of-roundness not exceeding the roundness working tolerance of the annular seal, and wherein step (d) comprises positioning the sub-inserts such that a first internal diameter zone of the complete annular molding surface of the sub-inserts is oriented adjacent the minor parting line and a second internal diameter zone is located angularly adjacent said first zone and is angularly spaced therefrom within the angular range of travel of the sub-inserts when operated in steps (d), (g) and (h), said second zone having a smaller internal diameter than said first zone.

9. A method of molding a sealing surface on a molded part wherein the sealing surface constitutes a surface of revolution and the part is molded in separable first and second partable mold halves that mate and meet when closed at a major parting line plane, the mold halves each having a mold half cavity, the half cavities of the mold halves together defining a complete mold cavity having a molding surface complemental to the exterior contour of the part to be molded therein when the mold halves are closed together, said method comprising the steps of:

(a) providing respectively in said first and second mold halves first and second mold inserts that each have a sub-insert flash trimming wheel component each defining a cooperative mold half cavity, said trim wheel half cavities together defining a complete annular molding surface shaped to encompass and define upon mold closure that portion of the complete mold cavity molding surface that is to mold form said sealing surface of revolution when said mold inserts are closed together to define a minor parting line plane therebetween, (b) rotatably supporting said sub-inserts in said associated inserts mold half for rotation about an axis parallel to the major parting line plane such that the minor parting line plane of said mold sub-inserts is orientable by such rotation through a given range of angular travel including a position flush with the mold major parting line plane, (c) closing the mold halves together, (d) angularly rotatably positioning said sub-inserts at an angular starting position such that the minor parting line plane is angularly positioned at a given angular orientation relative to the flush planes position thereof, said angular starting position being about 7 or 8° offset from said flush plane position (e) then filling the complete mold cavity with molding material in a liquid state, (f) allowing the liquid molding material to harden at least to a self-sustaining solidification strength at least in the part sealing surface zone adjacent the mold-sub-inserts cavity-defining surfaces, (g) then rotating the sub-inserts as a unit relative to the mold halves to thereby angularly shift the minor parting line plane of the sub-inserts to, and thereby move, and thereby trim, any parting line flash resident between the sub-inserts to, a second predetermined position angularly offset from the starting position whereby such sub-insert parting line flash that might otherwise remain resident on the sealing surface is substantially removed from its residence position on such surface at the starting position of said sub-inserts, (h) then rotating the sub-inserts to their flush planes position to thereby bring the minor and major parting lines flush with one another, (i) then opening the mold halves to remove the completed molded part.

10. The method of claim 9 wherein said given range of travel is in the order of 16°.

* * * * *